United States Patent
Athad

(10) Patent No.: US 11,590,590 B2
(45) Date of Patent: Feb. 28, 2023

(54) REINFORCED METAL SLITTER BODY HAVING INSERT POCKETS

(71) Applicant: Iscar, Ltd., Tefen (IL)

(72) Inventor: Shimon Athad, Maalot (IL)

(73) Assignee: Iscar, Ltd., Tefen (IL)

( * ) Notice: Subject to any disclaimer, the term of this patent is extended or adjusted under 35 U.S.C. 154(b) by 15 days.

(21) Appl. No.: 17/152,936

(22) Filed: Jan. 20, 2021

(65) Prior Publication Data
US 2021/0283698 A1 Sep. 16, 2021

Related U.S. Application Data

(60) Provisional application No. 62/988,675, filed on Mar. 12, 2020.

(51) Int. Cl.
*B23C 5/08* (2006.01)
*B23C 5/22* (2006.01)

(52) U.S. Cl.
CPC .............. *B23C 5/08* (2013.01); *B23C 5/2239* (2013.01); *B23C 2210/161* (2013.01); *B23C 2210/24* (2013.01); *B23C 2210/54* (2013.01)

(58) Field of Classification Search
CPC ....... B23C 5/08; B23C 5/2239; B23C 5/2298; B23C 2210/161; B23C 2210/244; B23C 2210/245; B23C 2220/36; B23C 3/28; B23C 3/30; B23C 3/305; B23B 2220/36; B23B 29/043; B23B 27/083; B23B 27/086; B23B 27/08; B23B 27/04; B23B 2210/025; B23B 2205/02; B23D 61/04; B23D 61/026

See application file for complete search history.

(56) References Cited

U.S. PATENT DOCUMENTS

| | | |
|---|---|---|
| 1,120,969 A | 12/1914 | Petzold |
| 1,935,069 A | 11/1933 | Walker et al. |
| 2,855,657 A | 10/1958 | Erhardt |
| 3,701,187 A | 10/1972 | Erkfritz |
| 3,887,975 A | 6/1975 | Sorice et al. |
| 4,363,576 A | 12/1982 | Zweekly |
| 4,738,570 A | 4/1988 | Wertheimer |
| 5,059,068 A | 10/1991 | Scott |
| 6,030,153 A | 2/2000 | Votsch et al. |
| 6,116,823 A | 9/2000 | Mihic |
| 6,276,879 B1 | 8/2001 | Hecht |
| 6,325,574 B1 | 12/2001 | Treige |

(Continued)

OTHER PUBLICATIONS

International Search Report dated Jun. 2, 2021, issued in PCT counterpart application (No. PCT/IL2021/050178).

(Continued)

*Primary Examiner* — Nicole N Ramos
(74) *Attorney, Agent, or Firm* — Womble Bond Dickinson (US) LLP

(57) ABSTRACT

A metal slitter body including a cylindrical body portion and cutting body portions extending outwardly from and integrally formed with the cylindrical body portion. The cutting body portions each include an insert pocket having an insert receiving slot, first and second clamping jaws and a slot end. The slitter body further including a reinforcement portion extending from the cylindrical body in an outward radial direction further than each slot end.

22 Claims, 4 Drawing Sheets

(56) References Cited

U.S. PATENT DOCUMENTS

| | | |
|---|---|---|
| 6,571,451 B2 | 6/2003 | Satran et al. |
| 6,971,823 B2 | 12/2005 | Satran et al. |
| 8,708,611 B2 | 4/2014 | Marshansky |
| 9,216,461 B2 | 12/2015 | Athad |
| 9,427,811 B2 * | 8/2016 | Malka .................. B23C 5/2472 |
| 2002/0066352 A1 | 6/2002 | Satran et al. |
| 2003/0202849 A1 | 10/2003 | Gamble et al. |
| 2005/0117981 A1 | 6/2005 | Satran et al. |
| 2009/0249607 A1 | 10/2009 | Kadosh |
| 2011/0236157 A1 | 9/2011 | Metzgar et al. |
| 2012/0082519 A1 | 4/2012 | Hecht |
| 2014/0013916 A1 | 1/2014 | Athad |
| 2014/0056659 A1 | 2/2014 | Athad |
| 2015/0056026 A1 | 2/2015 | Hecht |
| 2017/0368617 A1 | 12/2017 | Choi et al. |
| 2019/0160555 A1 | 5/2019 | Hecht et al. |
| 2019/0160559 A1 | 5/2019 | Athad |

OTHER PUBLICATIONS

Written Opinion dated Jun. 2, 2021, issued in PCT counterpart application (No. PCT/IL2021/050178).

\* cited by examiner

REINFORCED METAL SLITTER BODY HAVING INSERT POCKETS

RELATED APPLICATIONS

The present application claims priority to U.S. Provisional Patent Application No. 62/988,675 filed Mar. 12, 2020. The contents of the aforementioned application are incorporated by references in their entirety.

FIELD OF THE INVENTION

The subject matter of the present application relates generally to a slitter designed for a metal-working machine, and in particular to a slitter body of a slitting tool having a reinforced portion.

BACKGROUND OF THE INVENTION

Slitting is generally a term used for providing relatively thin slits in a workpiece.

The slitters relevant to the present application have a metal slitter body and are formed with insert pockets around the periphery thereof for receiving cutting inserts therein. The cutting inserts are made of a harder material than the slitter bodies, typically cemented carbide.

As the desired purpose of a slitter is often to provide as thin a slit as possible, the metal slitter body is extremely thin. As with all physical objects and their associated material properties, there are limitations to how thin and long a certain object can be and remain straight (unbent) during use. One solution is to enlarge the slitter body thickness to resist bending. However this is disadvantageous in that it reduces the cut depth a given slitter can cut and also increase the separation space of adjacent slitter bodies, for example as seen in FIG. 1C of U.S. Pat. No. 9,216,461.

It is an object of the present invention to provide a new and improved slitter body and/or slitter comprising same.

SUMMARY OF THE INVENTION

The present invention relates to providing a metal slitter body configured for resiliently holding cutting inserts and configured to provide thinner slits than was heretofore known to the applicant.

More specifically, for extremely thin slitting operations only resilient insert pockets are suitable because the thickness of a slitter body is too thin for screw holes and clamping arrangements. Stated differently, a slitting tool according to the present application can comprise only a slitter body and cutting inserts (i.e. such slitting tool can be devoid of screws). Alternatively stated, the slitter body has a unitary one-piece construction. Since no screws or clamps are used, the insert pockets are configured for resilient clamping of cutting inserts.

Additionally, at such thin slit widths, it was found that for metal slitter bodies having a width of about 0.7 mm, when inserting a cutting insert into the insert pocket, the extremely thin metal jaw of the insert pocket would bend resulting in an incorrect mounting position of the cutting insert.

As is well known, slitting operations require precise positioning of the cutting inserts to provide a straight cut (and accordingly tools such as that disclosed in U.S. Pat. No. 9,216,461 are provided with fine-tuning arrangements).

To overcome the above difficulties, a metal slitter body was provided with a reinforcement portion which extends adjacent the smaller (and hence weaker) clamping jaw of an insert pocket, thereby allowing mounting of a cutting insert in the insert pocket without bending of the clamping jaw.

Previously known slitter bodies have similar looking reinforcement portions but none are known to extend radially outward until they are adjacent to the insert pocket since this greatly limits the cut depth of the slitter.

Accordingly, for the present invention, it was deemed overall beneficial to limit the cut depth of the slitter in order to achieve a cut width smaller than previously known.

In accordance with a first aspect of the present invention, there is provided a metal slitter body including a cylindrical body portion and cutting body portions extending outwardly from and integrally formed with the cylindrical body portion. The cutting body portions each include an insert pocket having an insert receiving slot, first and second clamping jaws and a slot end. The slitter body further includes a reinforcement portion which is wider than an outermost part of the first and second clamping jaws and extends radially outward from the cylindrical body past each slot end.

Alternatively stated, the slot end is radially inward of the reinforcing portion, and the cut depth does not extend to the slot end in the radially inward direction.

More precisely, the metal slitter body comprises: a cylindrical body portion having a rotation axis ($A_R$) extending through a center thereof and defining a direction of rotation ($D_R$) thereabout; a plurality of cutting body portions extending outwardly from the cylindrical body portion; opposing first and second body side surfaces; and a body peripheral surface extending therebetween; the slitter body having a unitary one-piece construction; a width direction is defined parallel with the rotation axis ($A_R$); an outward radial direction is defined from the rotation axis ($A_R$) towards the body peripheral surface; an inward radial direction is defined opposite to the outward radial direction; a tangential direction extends perpendicular to the inward and outward radial directions; an imaginary bisecting plane (P) is defined as extending perpendicular to the rotation axis ($A_R$) and through the center of the plurality of cutting body portions; each of the plurality of cutting body portions comprising: a cutting body portion width CBW which is measurable along the width direction and from the first body side surface to the second body side surface; and an insert pocket configured for resilient clamping; each insert pocket comprising: an insert receiving slot; a first clamping jaw located on one side of the insert receiving slot; a second clamping jaw being smaller than the first clamping jaw and located on an opposite side of the insert receiving slot to the first clamping jaw; and a slot end connecting the first and second clamping jaws; the slitter body further comprises a reinforcement portion adjoining the cylindrical body; the slitter body, along the reinforcement portion, having a reinforcement portion width RW; the reinforcement portion width is greater than the cutting body portion width CBW; characterized in that: in each of the plurality of cutting body portions, the reinforcement portion extends in the outward radial direction ($D_O$) past the inward-most point of the slot end, adjacent to the second clamping jaw.

Stated in a different manner, the slitter body comprises a thinner width at the most radially outward portions of the clamping jaws and a thicker (reinforced portion) more inwardly radial to ensure the clamping jaws do not bend when mounting the cutting insert.

While it is believed essential that the reinforcement portion reaches at least the smaller clamping jaw (called the second clamping jaw), it may also be beneficial for the reinforcement portion to extend in the outward radial direction further than each of the slot ends also adjacent to each of the first clamping jaws.

It is also considered beneficial for the reinforcement portion to have a basic disc-shape for ease of production. Such a disc-shape can taper to the thinner clamping jaw at the periphery thereof, i.e., the reinforcement portion can comprise a peripheral chamfer.

While it is feasible for the reinforcement portion to extend symmetrically in the width direction to both sides of the bisecting plane, it is preferred for the reinforcement portion to extend in the width direction from the bisecting plane only in a single direction. This allows less production steps, albeit theoretically being slightly less balanced.

Since the possible depth of cut is already quite small, it is still preferred that the insert receiving slot extends in the inward radial direction more than it extends in the tangential direction. Thus, there is at least more cut depth than would be the case if a cutting insert and insert pocket of the types shown in U.S. Pat. No. 9,216,461 would be used. For this reason, it is preferred that the cutting insert (and accommodating insert pocket) in a side view, has a basic straight elongated shape.

For similar reasons, it is preferred that each cutting insert comprises only a single cutting edge. This is so as not to limit the cut depth by the cutting insert geometry itself (in addition to the limitation caused by the reinforcement portion).

While it may be counterintuitive for an extremely thin slitter, since bending is not desired, it has been found beneficial to provide a flexibility groove between each of the adjacent cutting body portions. The flexibility grooves preferably extend in the inward radial direction more than they extend in the tangential direction. To provide independence of the cutting portions the flexibility grooves can even extend from a part of the cutting portion which is located further outward of the reinforcement portion in the inward radial direction to a part of the reinforcement portion.

To give appropriate perspective as to the dimensions of the present invention, the slitter body according has a cutting body portion width preferably fulfilling the condition: CBW≤0.70 mm, and more preferably CBW≤0.60 mm. It was found that below such widths, the metal slitter body cannot reliably resiliently clamp cutting inserts without a reinforcement portion reaching the smaller jaw.

Nonetheless it is believed the lower thickness range of such slitter bodies fulfill the condition: CBW>0.30 mm and preferably CBW≥0.40 mm.

It will be understood that values approaching CBW=0.40 mm are most preferred.

The reinforcement portion width preferably fulfills the condition: RW≥0.8 mm, more preferably RW≥0.9 mm. It was found that providing reinforcement of this width makes possible reliable resilient clamping of the cutting inserts. It will be understood that increasing the width increases the constructional strength, but reduces the proximity to which an adjacent slitter can be provided (in a tool having a gang of parallel slitter bodies), or the proximity to a side wall to which a spindle holding a workpiece is mounted. Accordingly, it is preferred that the reinforcement portion width preferably fulfills the condition: RW≤1.5 mm, and more preferably RW≤1.1 mm.

Stated differently, the cutting body portion width CBW fulfills the condition: 0.7 mm>CBW>0.3 mm; and the reinforcement portion width RW fulfills the condition: 1.5 mm≥RW≥0.8 mm.

Preferably the diameter of the slitter body is between 25 mm and 50 mm but can be larger. The present invention has been implemented on 30 mm, 40 mm and 50 mm slitter bodies with success (noting the widths described above).

While it may seem counterintuitive to provide such a large slitter body for a relatively small cut depth (in the example shown the cut depth is 6 mm), having a large slitter body to achieve the relatively thin cut width is believed to be beneficial.

In accordance with a different preferred embodiment, the slitter body is provided with an insert receiving slot having an extended slot portion which extends further in the inward radial direction DI, i.e. beyond a slot relief portion.

One reason this can be beneficial is that an extended slot portion can allow a relatively smaller second jaw to have a greater jaw thickness T and hence more structural strength.

Additionally or alternatively, another reason this design is beneficial is that the reinforcement portion, while still extending further radially outward than an inward-most point of the slot end, extends further in the radially outward direction. This allows the slitter body to provide a larger cut depth.

Preferably, both the slot relief portion of the insert receiving slot and the extended slot portion have basic round shapes. Stated differently, there is a wall projection extending partially between them. The round shape of the relief portion and the wall projection allow a standard ejection tool to eject the cutting insert (by being biased against the wall projection).

A length LS of the extended slot portion is roughly equivalent to a relief portion length LS2.

According to a further aspect there is provided a slitter comprising a slitter body according to either of the embodiments described above and a cutting insert mounted in each of the insert pockets.

Each cutting insert comprises a cutting edge having a cutting edge width CW which is larger than the cutting body portion width CBW, the cutting edge extending further in the width direction than the cutting body portion on both sides on the bisecting plane. In other words, the slitter is what is known a fully effective slitter (as opposed to half-effective slitter in which the inserts are arranged in a staggered pattern).

Preferably, the first and second clamping jaws, and corresponding cutting insert surfaces, are formed with tapered sub-surfaces. While for some machining operations it is sufficient to have a tapered shape on only one side of an insert, for the extremely thin applications under discussion it is incredibly difficult to mount a cutting insert without a tapered construction on both sides of the shank portion thereof to such a thin insert pocket (noting that the invention here relates to clamping jaws having a width of 0.7 mm and less).

According to a further aspect, there is provided a metal slitter body having unitary, one-piece construction, and comprising: a cylindrical body portion having a rotation axis ($A_R$) extending through a center thereof and defining a direction of rotation ($D_R$) thereabout, the cylindrical body portion comprising: opposing first and second body side surfaces; a body peripheral surface extending between the first and second side surfaces; an outward radial direction ($D_O$) from the rotation axis ($A_R$) towards the body peripheral surface; an inward radial direction ($D_I$) opposite to the outward radial direction ($D_O$); and a tangential direction ($D_T$) extending perpendicular to the inward and outward radial directions; a plurality of cutting body portions extending outwardly from the cylindrical body portion, each cutting body portion having: a cutting body portion width CBW measurable in a width direction ($D_W$) parallel to the rotation axis ($A_R$), between the first and second body side surfaces; and an insert pocket configured for resilient clamping, the insert pocket comprising: an insert receiving slot; a first clamping jaw located on one side of the insert receiving slot; a second clamping jaw located on an opposite side of the insert receiving slot from the first clamping jaw, the second clamping jaw being smaller than the first clamping jaw; and a slot end connecting the first and second clamping jaws, and having a radially inward-most point; and a reinforcement portion adjoining the cylindrical body portion, the reinforcement portion having a reinforcement portion width RW greater than the cutting body portion width CBW; wherein: in each of the plurality of cutting body portions, the reinforcement portion extends in the outward radial direction ($D_O$) past the inward-most point of the slot end, towards the second clamping jaw.

According to any of the aspects, the slitter body can have an imaginary bisecting plane (P) extends perpendicular to the rotation axis ($A_R$) and through the center of the plurality of cutting body portions; the reinforcement portion is entirely on one side of the imaginary bisector plane (P); a flexibility groove is located between each pair of adjacent cutting body portions; and between each pair of adjacent flexibility grooves, the reinforcement portion extends in the outward radial direction past the inward-most point of the slot end, to both the first clamping jaw and the second clamping jaw belonging to one of the cutting body portions.

DETAILED DESCRIPTION

Figure 1:
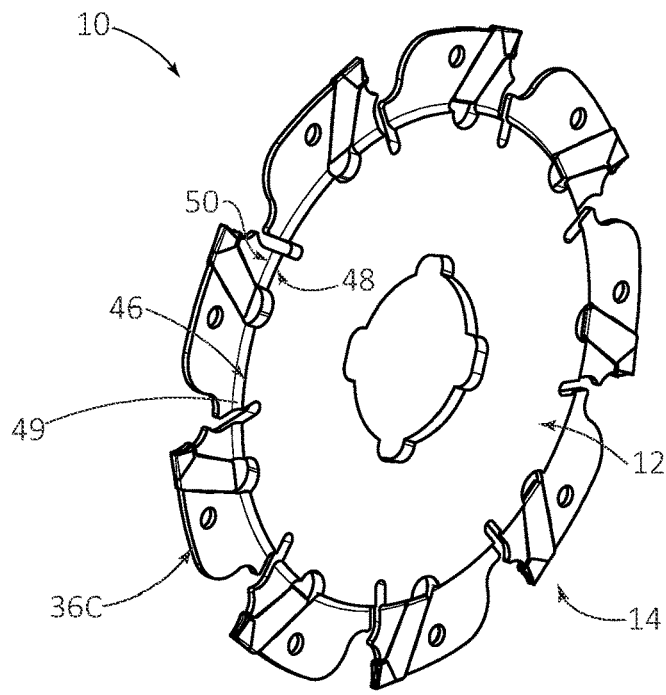
FIG. 1 is a perspective view of a slitting tool according to the present invention.

Reference is made to FIG. 1, which illustrates a first preferred embodiment of a slitting tool 10.

The slitting tool 10 comprises a metal slitter body 12, and one or more cutting inserts 14 (all of which are identical in the preferred yet non-limiting example) mounted to the slitter body 12. The cutting inserts 14 are typically made of cemented carbide.

Figure 2A:
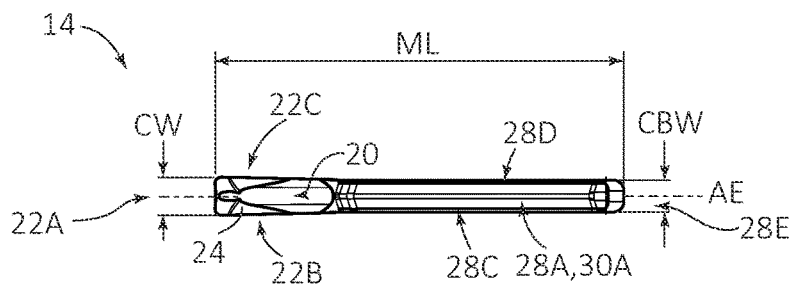
FIG. 2A is a top view of a cutting insert of the slitting tool in FIG. 1.
Figures 2B, 2C:
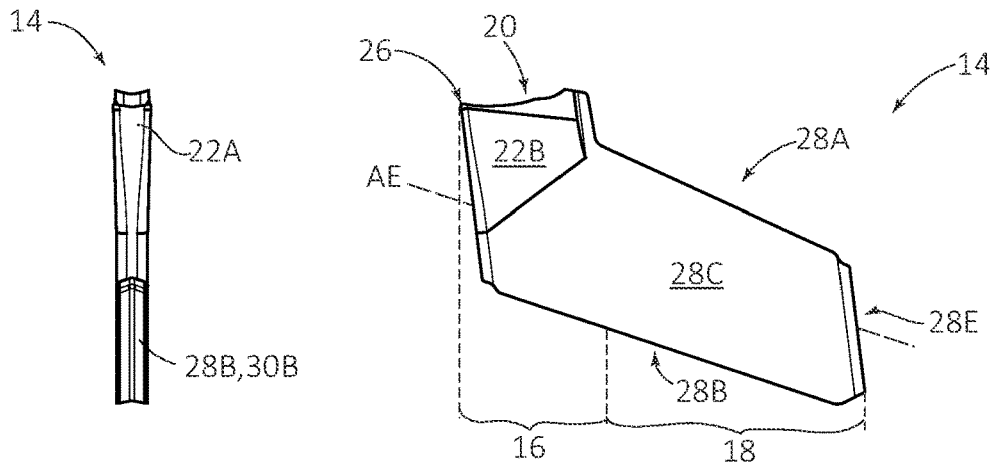
FIG. 2B is a front view of the cutting insert in FIG. 2A.
FIG. 2C is a side view of the cutting insert in FIGS. 2A and 2B.

Referring to FIGS. 2A to 2C, one of the cutting inserts 14 will be described in detail.

The cutting insert 14 comprises a cutting portion 16 and a shank portion 18 extending therefrom.

The cutting portion 16 comprises a rake surface 20 (above which chips are intended to flow) and front, first-side and second-side relief surfaces 22A, 22B, 22C tapering inwardly with increasing distance from the rake surface 20.

The rake surface 20 preferably has a chip-forming arrangement 24.

A cutting edge 26 extends along the intersection of the rake surface 20 and front, first-side and second-side relief surfaces 22A, 22B, 22C.

The shank portion 18 comprises an upper shank surface 28A, a lower shank surface 28B, first and second side shank surfaces 28C, 28D connecting the upper shank surface 28A and lower shank surface 28B, and a rear shank surface 28E connecting the upper, lower, first and second side shank surfaces 28A, 28B, 28C, 28D.

The overall shape of the cutting insert 14, and particularly the shank portion 18 thereof is a basic straight elongated shape.

More precisely, the cutting insert 14 is elongated along an elongation axis AE extending through the rear shank surface and the front relief surface.

The width of a slit (not shown) cut by the slitting tool 10 (in a workpiece) corresponds to the cutting edge width CW. As the cutting insert 14 comprises only a single cutting edge 26, the entire cutting insert 14 can be located within the slit and fully occupies the latter's width.

This is because the cutting edge with its cutting edge width CW extends further in the width direction on both sides of the bisector plane P, than the cutting body portion of the metal slitter body 12 with its cutting body portion width CBW (the cutting body portion width CBW is only shown for understanding or comparison in the enlarged view of FIG. 2A, it will be understood it relates to the slitter body 12 and not the cutting insert 14).

In this preferred example the cutting edge width CW is 0.6 mm, which is smaller than is known for slitting tools to the present applicant.

A maximum length ML of the cutting insert 14, in the top view of 2A, is approximately 6 mm. In a slightly rotated view without the rear shank surface being visible the length would be about 5.8 mm.

Figures 4A, 4B:
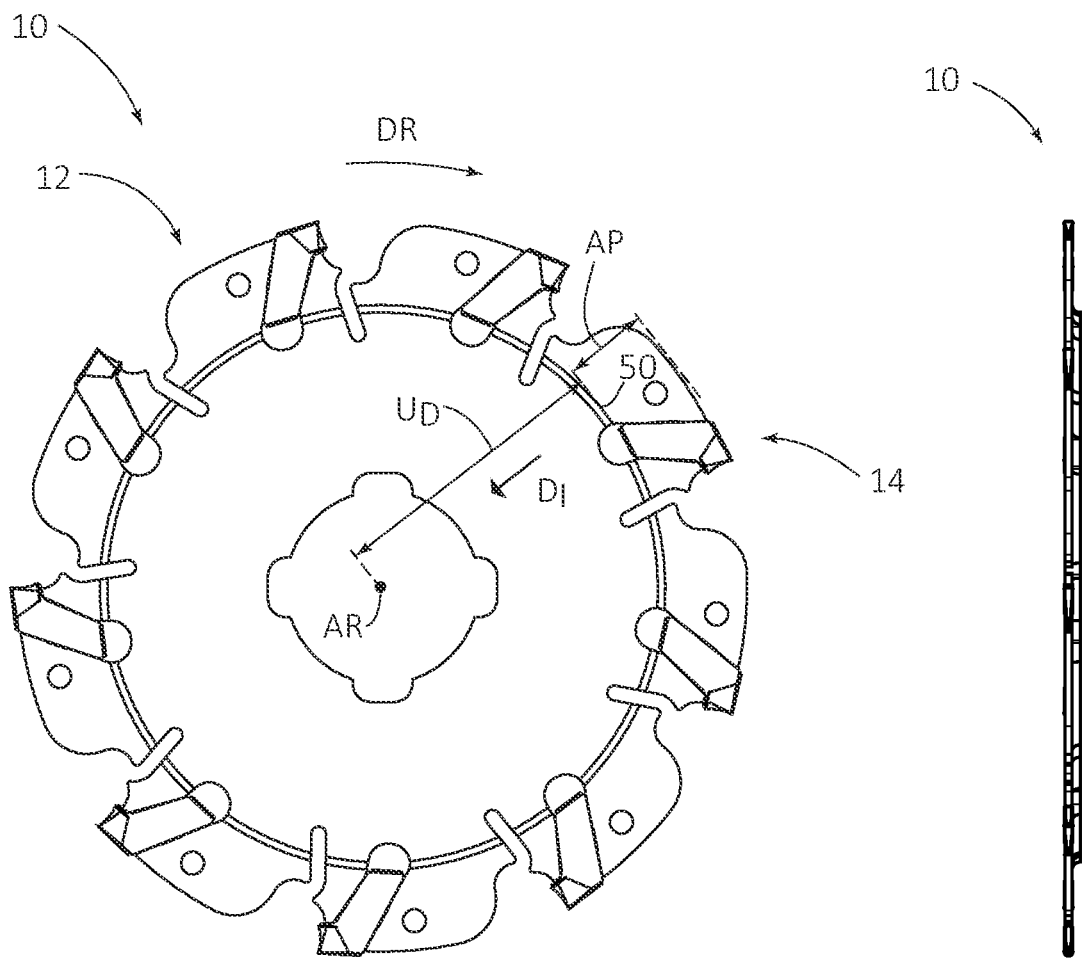
FIG. 4A is a side view of the slitting tool in FIG. 1.
FIG. 4B is a front view of the slitter body in FIG. 4A.

Referring also to FIG. 4A, the cut depth AP of the slitting tool 10 in this example corresponds basically to the maximum length ML.

For the reasons explained above, the upper shank surface 28A is formed with a tapered sub-surface 30A (FIG. 2A), and the opposite lower shank surface 28B is formed with a tapered sub-surface 30B (FIG. 2B). These tapered sub-surfaces 30A, 30B facilitate sliding mounting of the cutting insert 14 on corresponding tapered first and second clamping sub-surfaces 42, 44 (described below) of insert pockets 38 formed on the slitter body 12.

Such tapered sub-surfaces are known in the art, but for the present invention it is particularly advantageous for the two opposing surfaces (upper and lower shank surfaces) to be formed with tapered sub-surfaces in view of the particular difficulty with mounting the cutting inserts 14 (noting that there also exists cutting inserts which have only one tapered sub-surface, and are considered more stable since they have a planar sub-surface rather than a second tapered sub-surface).

Figures 3A, 3B:
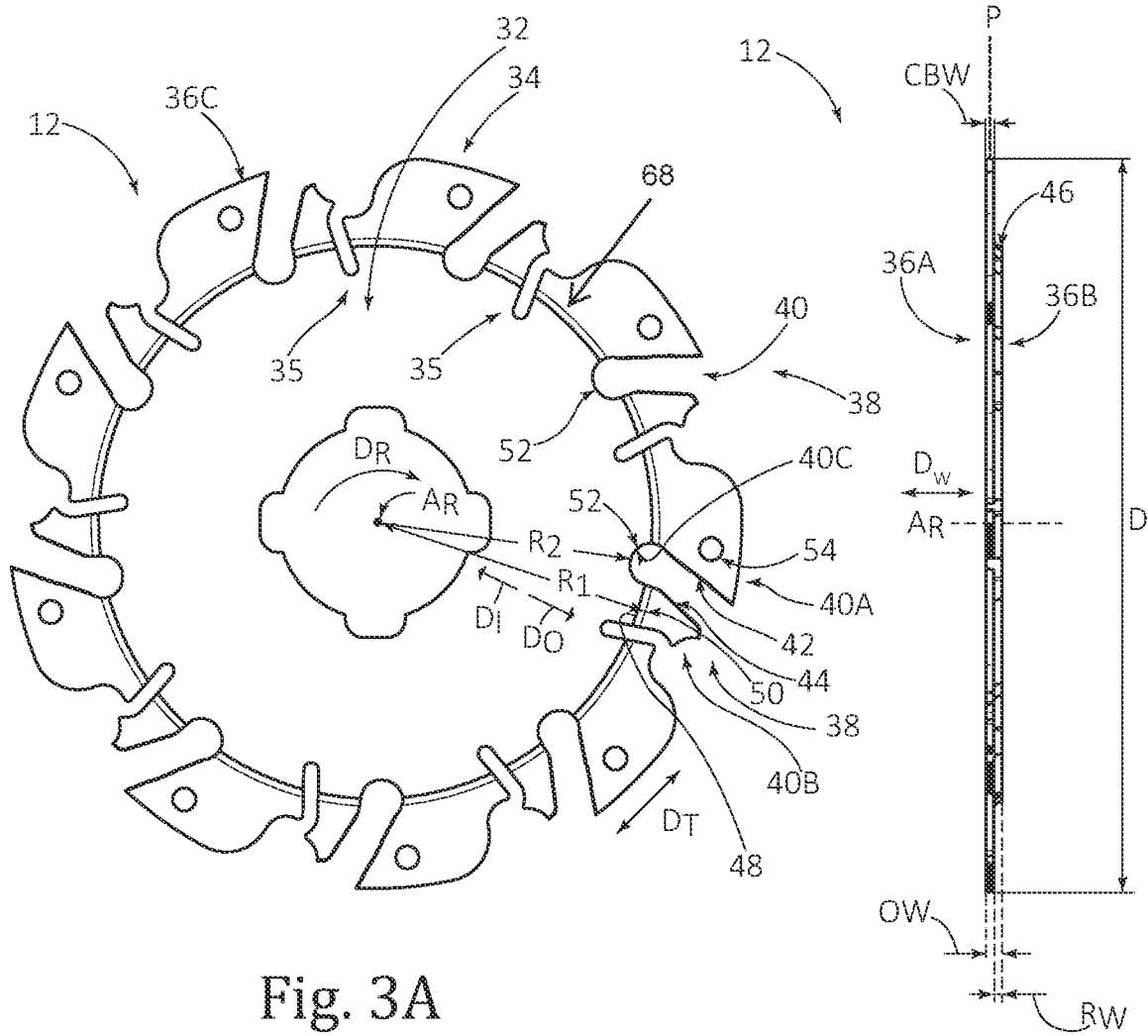
FIG. 3A is a side view of a slitter body of the slitting tool in FIG. 1.
FIG. 3B is a front view of the slitter body in FIG. 3A.

Referring to FIGS. 3A and 3B, the slitter body 12 will now be described.

The slitter body 12 comprises a cylindrical body portion 32 having a rotation axis $A_R$ extending through the center thereof and defining a direction of rotation $D_R$ thereabout and a plurality of cutting body portions 34 extending outwardly from the cylindrical body portion 32.

The slitter body 12 comprises a first body side surface 36A and an opposing second body side surface 36B, and a body peripheral surface 36C extending therebetween.

A width direction $D_W$ is defined parallel with the rotation axis $A_R$.

An outward radial direction $D_O$ is defined from the rotation axis $A_R$ towards the body peripheral surface 36C.

An inward radial direction $D_I$ is defined opposite to the outward radial direction $D_O$.

A tangential ("circumferential") direction $D_T$ extends perpendicular to the inward and outward radial directions along the outermost portion of the body peripheral surface 36C.

An imaginary bisecting plane P is defined as extending perpendicular to the rotation axis $A_R$ and through the center of the plurality of cutting body portions 34.

The cutting body portions 34 are identical and hence the arrows designating portions thereof may be directed to different cutting body portions 34 simply for ease of visibility.

A flexibility groove 35 extends between each of the adjacent cutting body portions 34.

Each of the plurality of cutting body portions 34 comprises: a cutting body portion width CBW which is measurable along the width direction $D_W$ and from the first body side surface 36A to the second body side surface 36B. More specifically, the cutting body portion width CBW only applies to those portions of the cutting body portions 34 which are not adjacent to the reinforcement portion. In other words, the cutting body portion width CBW does not include the width of the reinforcement portion.

Each cutting body portion 34 comprises an insert pocket 38.

Each insert pocket 38 comprises an insert receiving slot 40; a first clamping jaw 40A, a second clamping jaw 40B and a slot end 40C connecting the first and second clamping jaws 40A, 40B. In the embodiments shown, the second clamping jaw 40B is circumferentially forward of the first clamping jaw 40A, in the direction of rotation $D_R$.

It will be understood that the first clamping jaw 40A has a first clamping sub-surface 42 facing the insert receiving slot 40 and being formed with a tapered shape configured (as known in the art) to engage the tapered sub-surface 30B of the lower shank surface 28B of the cutting insert 14.

Similarly, the second clamping jaw 40B has a second clamping sub-surface 44 opposite the first clamping sub-surface 42, and facing the insert receiving slot 40. The second clamping sub-surface 44 being formed with a tapered shape configured (as known in the art) to engage the tapered sub-surface 30A of the upper shank surface 28A of the cutting insert 14.

The slitter body 12 further comprises a reinforcement portion 46 adjoining the cylindrical body portion 32. The reinforcement portion 46 extends, in the radially outward direction $D_O$, towards the plurality of cutting body portions 34. In the embodiment seen in FIG. 3B, the second body side surface 36B is formed on the reinforcement portion 46. The slitter body 12 is wider at the reinforcement portion 46 than at the extremity of the cutting portion 34 having a cutting body portion width CBW. The reinforcement portion 46 has a reinforcement portion width RW. The overall width OW of the slitter body 12 (where there is a reinforcement portion 46) is the sum of the cutting body portion width CBW and the reinforcement portion width RW. As seen in the side view of FIG. 3A, the reinforcement portion 46 can appear circular, and thus have continuous rotational symmetry (i.e., rotational symmetry at all angular displacements) about the rotation axis $A_R$. However, in other embodiments, the reinforcement portion 46 may instead have discrete rotational symmetry (i.e., rotational symmetry only at discrete angular displacements).

In the embodiments shown, the reinforcement portion 46 is formed on only one side of the bisecting plane P. One feasible alternative design would be for a reinforcement portion (not shown) to be symmetric about the bisecting plane P. However, such an alternative design would require both sides of the slitter body 12 to be machined, and so is less preferred.

The reinforcement portion 46 preferably, but optionally, has a basic disc-shape which extends to an inner boundary 48 at which it still has the reinforcement portion width RW. In a further radially outward position the reinforcement portion 46 preferably, but optionally, tapers (i.e. has a peripheral chamfer 49) towards the bisecting plane P to the cutting portion 34 at an outer boundary 50. As seen in the side of view of FIG. 3A, at the inner boundary, the reinforcement portion 46 defines a circular contour 68. Furthermore, this circular contour 68 is located, in the radially outward direction $D_O$, no further than half way up the radial extent of any of the insert receiving slots 40. As seen in the figures, the insert receiving slots 40 and the flexibility grooves 35 all straddle the inner and outer boundaries of the reinforcement portion 46. However, no portion of a flexibility groove 35 is located between the rotation axis $A_R$ and the insert receiving slot 40 closest to that flexibility groove 35.

It will be understood that the slitting tool 10 cannot enter a workpiece radially inward of the outer boundary 50. This is because the slitter body 12 becomes wider radially inward of the outer boundary 50 where the reinforcement portion 46 commences. And while the cut width CW of the cutting insert 14 is wider than the cutting body portion width CBW, it is not wider than the slitter body 12 where the reinforcement portion 46 is present.

Referring also to FIGS. 4A and 4B, some perspective will be given as to the dimensions of the preferred embodiment shown.

The cut depth AP (measured to about the outer boundary 50 in the inward direction $D_I$) is about 6 mm. The diameter D is about 50 mm. This means that the unutilized depth UD of the slitting tool 10 is about 44 mm or 88%.

However, reverting to FIG. 3A, since the reinforcement portion 46 extends a first radial length R1 (measurable from the rotation axis $A_R$ to the outer boundary 50) which is greater than a second radial length R2 (measurable from the rotation axis $A_R$ to the inward-most point 52 of the slot end 40C) the reinforcement portion 46 provides the relatively smaller second clamping jaw 40B with enough constructional strength to consistently clamp the cutting insert 14 thereto. In other words, the reinforcement portion 46 protects the second clamping jaw 40B, for example from bending forces that may be experienced during mounting of an insert to the insert pocket 38.

Preferably, but optionally, each insert pocket 38 can be associated with an ejection hole 54 used to pry open the resilient insert pocket 38 to remove a cutting insert 14 therefrom.

Figure 5:
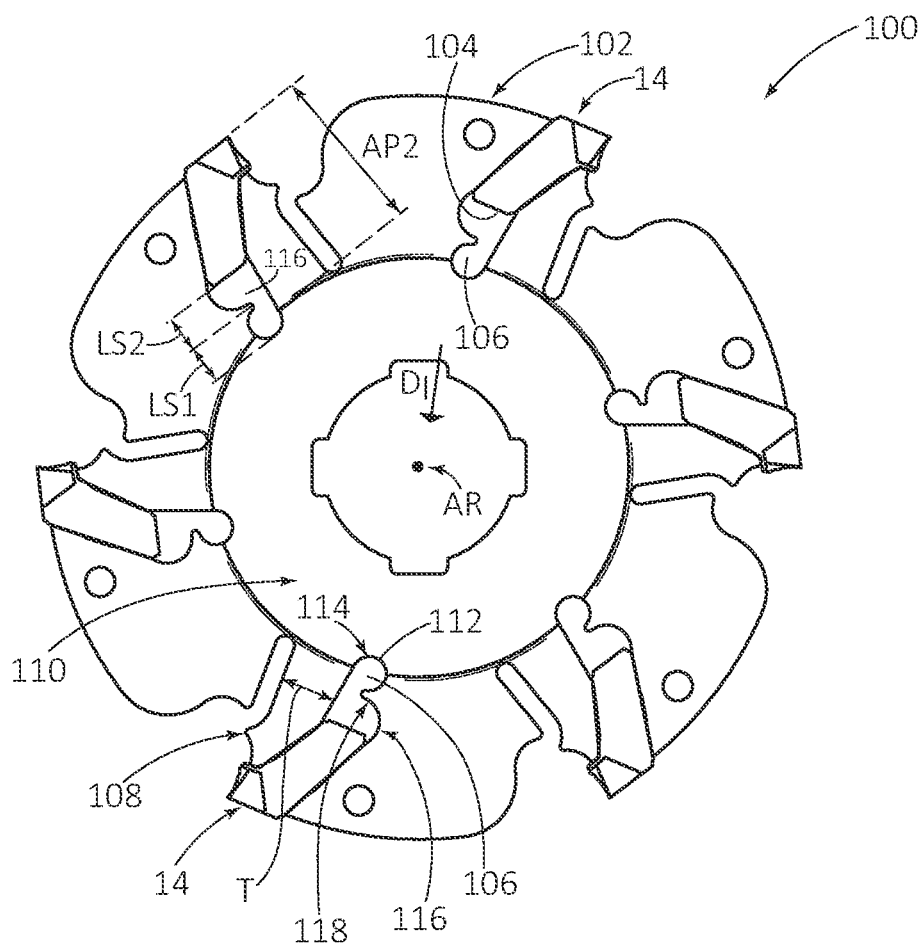
FIG. 5 is a side view of a slitting tool according to another embodiment of the present invention.

Referring to FIG. 5, a second preferred embodiment of a slitting tool 100 will now be described.

The slitting tool 100 comprises a metal slitter body 102, and one or more cutting inserts 14 (which are identical to those described above).

The basic construction of the slitter body 102 is similar to the slitter 12 described above except that an insert receiving slot 104 has an extended slot portion 106 which protrudes in the inward radial direction DI.

The extended slot portion 106 allows the relatively smaller second jaw 108 to have a greater jaw thickness T and hence more structural strength.

Similar to the first embodiment, the reinforcement portion 110 extends further radially outward than an inward-most point 112 of the slot end 114. And again, the reinforcement portion 110 extends to the second clamping jaw 108.

In the non-limiting embodiment shown in FIG. 5, both a relief portion 116 of the insert receiving slot 104 (i.e. the portion of the insert receiving slot 104 still designed to accommodate the cutting insert 14 but leaving a relief space therefor) and the extended slot portion 106 have basic round shapes. As seen in FIG. 5, a wall projection 118 extends partially between the relief portion 116 and the extended slot portion 106.

A first radial length LS1 of the extended slot portion 106 is roughly equivalent to a second radial length LS2 of the relief portion 116 (i.e. the radial length of the space not accommodated by the cutting insert 14).

As will be understood, providing the extended slot 106 may be one way to increase the depth of cut which in FIG. 5 is designated AP2.

The description above includes exemplary embodiments but does not exclude non-exemplified embodiments and details, all of which fall within the claim scope of the present application.

The invention claimed is:

1. A metal slitter body comprising:
   a cylindrical body portion having a rotation axis ($A_R$) extending through a center thereof and defining a direction of rotation ($D_R$) thereabout;
   a plurality of cutting body portions extending outwardly from the cylindrical body portion;
   opposing first and second body side surfaces; and
   a body peripheral surface extending therebetween;
   the slitter body having a unitary one-piece construction and being devoid of screw holes;
   a width direction is defined parallel with the rotation axis ($A_R$);
   an outward radial direction is defined from the rotation axis ($A_R$) towards the body peripheral surface;
   an inward radial direction is defined opposite to the outward radial direction;
   a tangential direction extends perpendicular to the inward and outward radial directions;
   an imaginary bisecting plane (P) is defined as extending perpendicular to the rotation axis ($A_R$) and through the center of the plurality of cutting body portions;
   each of the plurality of cutting body portions comprising:
   a cutting body portion width CBW which is measurable along the width direction and from the first body side surface to the second body side surface; and
   an insert pocket configured for resilient clamping;
   each insert pocket comprising:
   an insert receiving slot;
   a first clamping jaw located on one side of the insert receiving slot;
   a second clamping jaw being smaller than the first clamping jaw and located on an opposite side of the insert receiving slot to the first clamping jaw; and
   a slot end connecting the first and second clamping jaws;
   the slitter body further comprises a reinforcement portion adjoining the cylindrical body;
   the slitter body, along the reinforcement portion, having a reinforcement portion width RW;
   the reinforcement portion width is greater than the cutting body portion width CBW;
   characterized in that:
   in a side view of the slitter body, the reinforcement portion defines a circular contour; and
   in each of the plurality of cutting body portions, the reinforcement portion extends in the outward radial direction ($D_O$) past the inward-most point of the slot end, adjacent to the second clamping jaw.

2. The slitter body according to claim 1, wherein, in each of the plurality of cutting body portions, the reinforcement portion extends in the outward radial direction past the inward-most point of the slot end, adjacent to the first clamping jaw.

3. The slitter body according to claim 1, wherein:
   the imaginary bisecting plane (P) extends perpendicular to the rotation axis ($A_R$) and through the center of the plurality of cutting body portions; and
   the reinforcement portion extends in the width direction from the bisecting plane (P) only in a single direction.

4. The slitter body according to claim 1, wherein the insert receiving slot extends in the inward radial direction more than it extends in the tangential direction.

5. The slitter body according to claim 1, further comprising a flexibility groove located between each pair of adjacent cutting body portions.

6. The slitter body according to claim 5, wherein each flexibility groove extends in the inward radial direction more than it extends in the tangential direction.

7. The slitter body according to claim 5, wherein each flexibility groove extends from a part of the cutting body portion located radially outward of the reinforcement portion in the inward radial direction to a part of the reinforcement portion.

8. The slitter body according to claim 1, wherein the cutting body portion width CBW fulfills the condition: CBW<0.70 mm.

9. The slitter body according to claim 8, wherein the cutting body portion width CBW fulfills the condition: CBW≤0.60 mm.

10. The slitter body according to claim 8, wherein the cutting body portion width CBW fulfills the condition: CBW>0.30 mm.

11. The slitter body according to claim 10, wherein the cutting body portion width CBW fulfills the condition: CBW≥0.40 mm.

12. The slitter body according to claim 1, wherein the reinforcement portion width RW fulfills the condition: RW≤1.5 mm.

13. The slitter body according to claim 12, wherein the reinforcement portion width RW fulfills the condition: RW≤1.1 mm.

14. The slitter body according to claim 12, wherein the reinforcement portion width RW fulfills the condition: RW≥0.8 mm.

15. The slitter body according to claim 14, wherein the reinforcement portion width RW fulfills the condition: RW≥0.9 mm.

16. The slitter body according to claim 1, wherein a wall projection protrudes into the insert receiving slot and defines an extended slot portion which constitutes a radially inward-most portion of the insert receiving slot.

17. The slitter body according to claim 16, wherein the extended slot portion has a round shape.

18. A slitter comprising:
   a slitter body according to claim 1, and
   a cutting insert mounted in each of the insert pockets;
   wherein each cutting insert comprises a cutting edge having a cutting edge width CW extending further in the width direction further than the cutting body portion width CBW.

19. The slitter according to claim 18, wherein each cutting insert comprises only a single cutting edge.

20. The slitter according to claim 18, wherein, in a side view, each cutting insert has a basic straight elongated shape.

21. The slitter body according to claim 1, further comprising a flexibility groove located between each pair of adjacent cutting body portions, no portion of the flexibility groove being located between the rotation axis ($A_R$) and a radially inward-most point of the insert receiving slot closest to that flexibility groove.

22. The slitter body according to claim 21, wherein:
the cutting body portion width CBW fulfills the condition:
    0.7 mm>CBW>0.3 mm; and
the reinforcement portion width RW fulfills the condition:
    1.5 mm≥RW≥0.8 mm.

* * * * *